US008527816B2

(12) United States Patent
Lindeman et al.

(10) Patent No.: US 8,527,816 B2
(45) Date of Patent: Sep. 3, 2013

(54) IDENTIFYING A DEFECTIVE ADAPTER

(75) Inventors: James A Lindeman, Austin, TX (US);
Orlando O'Neill, Evanston, IL (US);
Gary Lee Ruzek, Austin, TX (US);
Chris Alan Schwendiman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 12/720,929

(22) Filed: Mar. 10, 2010

(65) Prior Publication Data
US 2011/0225446 A1    Sep. 15, 2011

(51) Int. Cl.
*G06F 11/00*    (2006.01)

(52) U.S. Cl.
USPC ............. 714/44; 714/5.1; 714/25; 714/36; 714/48; 710/8; 710/10

(58) Field of Classification Search
USPC .............. 714/5.1, 5.11, 25, 36, 40, 44, 48, 714/57; 710/8, 10, 104, 301, 302
See application file for complete search history.

(56) References Cited

U.S. PATENT DOCUMENTS

| 5,579,529 A * | 11/1996 | Terrell et al. .................. 710/8 |
| 5,630,142 A | 5/1997 | Crump et al. |
| 5,657,455 A * | 8/1997 | Gates et al. .................. 710/104 |
| 5,889,965 A * | 3/1999 | Wallach et al. ............... 710/302 |
| 5,940,586 A * | 8/1999 | Bealkowski et al. ......... 714/5.11 |
| 6,023,736 A | 2/2000 | Lambeth et al. |
| 6,035,355 A * | 3/2000 | Kelley et al. ................. 710/302 |
| 6,418,492 B1 * | 7/2002 | Papa et al. .................... 710/302 |
| 2002/0144191 A1 * | 10/2002 | Lin ............................... 714/46 |
| 2005/0257100 A1 * | 11/2005 | Anglin et al. .................. 714/48 |
| 2008/0263391 A1 * | 10/2008 | Blinick et al. .................... 714/5 |
| 2009/0016369 A1 * | 1/2009 | Banerjee et al. ............... 370/408 |

FOREIGN PATENT DOCUMENTS

JP    02098748 A    4/1990

OTHER PUBLICATIONS

H248, Middlebrooks, Herbert, et al; Apr. 7, 1987, C2L41-C3L17.

* cited by examiner

*Primary Examiner* — Joseph D Manoskey
(74) *Attorney, Agent, or Firm* — Garg Law Firm, PLLC; Rakesh Garg; Libby Z. Toub

(57) ABSTRACT

A method, system, and computer usable program product for identifying a defective adapter are provided in the illustrative embodiments. A configuration process of the adapter is initiated, the adapter being coupled with a slot in a data processing system. An indication of the configuration process is activated. A determination is made whether the configuration has completed successfully. The indication is allowed to remain activated responsive to the configuration not completing successfully. The activated indication identifies the defective adapter.

18 Claims, 5 Drawing Sheets

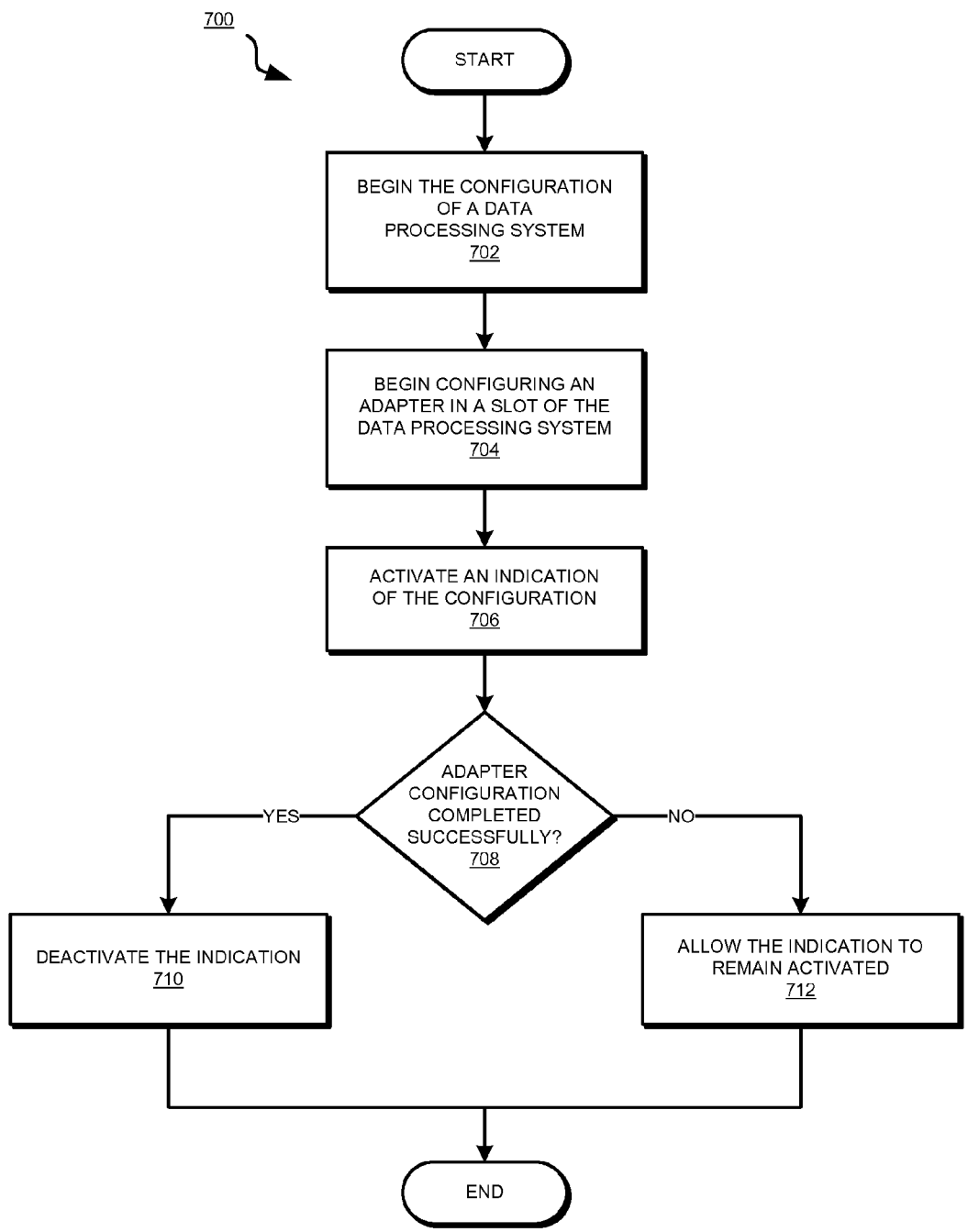

IDENTIFYING A DEFECTIVE ADAPTER

BACKGROUND OF THE INVENTION

1. Field of the Invention

The present invention relates generally to an improved data processing system, and in particular, to a computer implemented method for configuring components in a data processing system. Still more particularly, the present invention relates to a computer implemented method, system, and computer usable program code for identifying a defective adapter in a data processing system.

2. Description of the Related Art

Data processing systems include slots where additional circuitry can be added to perform specific functions. Such additional circuitry is called an adapter. One example of an adapter is a network adapter that can be added to a data processing system for enabling the data processing system to communicate over a data network. Another example of an adapter is a graphics card enabling the data processing system to perform manipulations of graphics and displayed information.

Many types of adapters currently exist that can be added to a data processing system for performing a variety of functions. A slot in a data processing system is an electrical connector configured to receive an adapter and to electrically enable the adapter.

When a data processing system is booted up, a step in the booting process configures an adapter. Typically, an adapter may be configured to initialize certain electronic components, populate data in some memory components of the adapter, or otherwise make the adapter operational and ready for performing the adapter's function.

Data processing systems can be configured in a variety of ways. For example, the components in a data processing system may be configured to operate in a manner such that the data processing system behaves as a single data processing unit. The memory in such a configuration operates to support data manipulation for the single data processing unit.

As another example, data processing systems can be divided into logical partitions (LPARs). Such data processing systems are also known as logical partitioned data processing systems. A logical partition is also known simply as a "partition." Each partition operates as a separate data processing system independent of the other partitions. Generally, a partition management firmware component connects the various partitions and provides the network connectivity among them. A Hypervisor is an example of such partition management firmware.

One or more memory adapters may be present in a logical partitioned data processing environment. A partition may access one or more adapters across one or more partitions for manipulating data.

SUMMARY OF THE INVENTION

The illustrative embodiments provide a method, system, and computer usable program product for identifying a defective adapter in a data processing system. An embodiment initiates configuration of the adapter, the adapter being coupled with a slot in a data processing system. The embodiment activates an indication of the configuration. The embodiment determines whether the configuration has completed successfully. The embodiment allows the indication to remain activated responsive to the configuration not completing successfully, the activated indication identifying the defective adapter.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 7 depicts a flowchart of a process of identifying a defective adapter in accordance with an illustrative embodiment.

DETAILED DESCRIPTION OF THE PREFERRED EMBODIMENT

Figure 1:
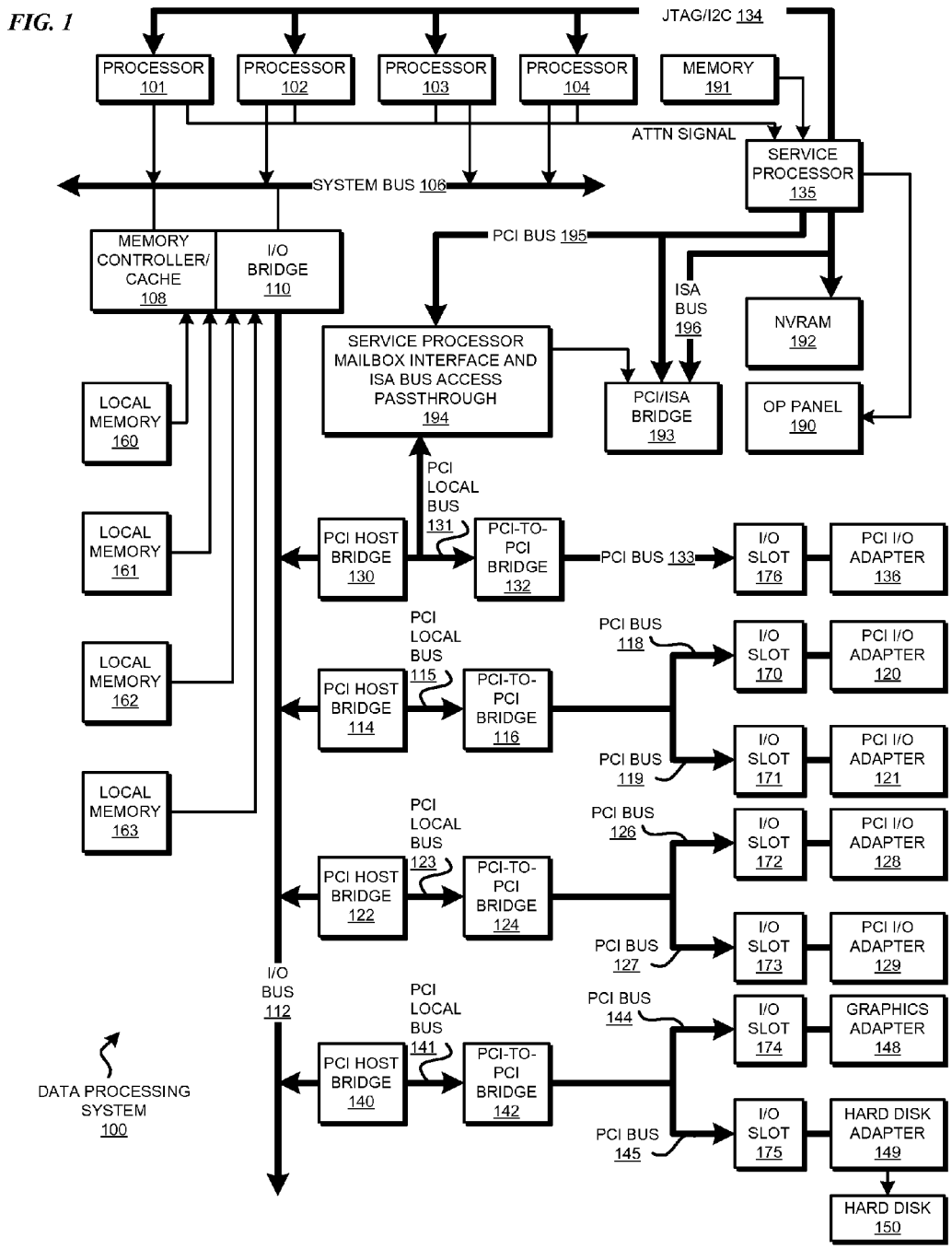
FIG. 1 depicts a block diagram of a data processing system in which the illustrative embodiments may be implemented is depicted.

A number of adapters may be present in certain data processing system configurations. For example, certain LPAR configurations are known to include dozens of adapters distributed across several partitions.

The invention recognizes that a number of adapters may be configured or initialized at different times during the operation of a particular data processing system. For example, many adapters are configured at the time of booting up the data processing system. Many other adapters may be initialized or reconfigured while the data processing system is operational. An adapter may be added or replaced in an operational data processing system through a process known as hot-swap.

The invention further recognizes that configuring an adapter can have system-wide implications. For example, the invention recognizes that a configuration process of an adapter, such as during boot-up or hot-swap, can fail. The invention recognizes that failure of an adapter configuration process can cause the entire system to become inoperative. For example, if a configuration process of an adapter fails during boot-up, the entire system may fail to boot-up. As another example, if a configuration process of an adapter fails while the associated data processing system is operational, the entire data processing system or a portion thereof may become non-responsive.

The invention recognizes that the configuration process of an adapter can fail for a variety of reasons. One reason for the failure of the adapter configuration process is a defect in the adapter's circuitry that prevents the adapter from being configured correctly. Another example for the failure may be a defect in the data associated with the adapter. For example, a configuration file or initialization data used in the configuration process may be defective.

An adapter may be defective for a variety of reasons. Generally, an adapter is regarded as defective if the adapter cannot be configured as and when desired. A defective adapter can be difficult to identify in a data processing system. Often, the process of isolating a defective adapter is a trial and error process where adapters are removed or deactivated one at a time and the boot-up or other configuration process repeated until the defective adapter is located.

The illustrative embodiments used to describe the invention address and solve these and other problems related to adapters. The illustrative embodiments provide a method, computer usable program product, and data processing system for identifying a defective adapter. Using the illustrative embodiments, a data processing system, can provide an indication of a defective adapter during the configuration of the adapter. Using the illustrative embodiments, the data processing system can therefore make the process of identifying and isolating a defective adapter faster and easier as compared to the presently used trial and error process.

An embodiment of the invention may make it possible to detect the defective adapter by direct observation of the adapter or the data processing system. Another embodiment may make it possible to detect a defective adapter remotely, such as from a monitoring station away from the adapter or the data processing system.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

Furthermore, the illustrative embodiments are described in some instances using particular software tools and data processing environments only as an example for the clarity of the description. The illustrative embodiments may be used in conjunction with other comparable or similarly purposed systems, applications, or architectures. For example, some illustrative embodiments that are described in conjunction with virtualized logical partitioned environments can be used in conjunction with any data processing system where the illustrative embodiments can be implemented in the manner described within the scope of the invention.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
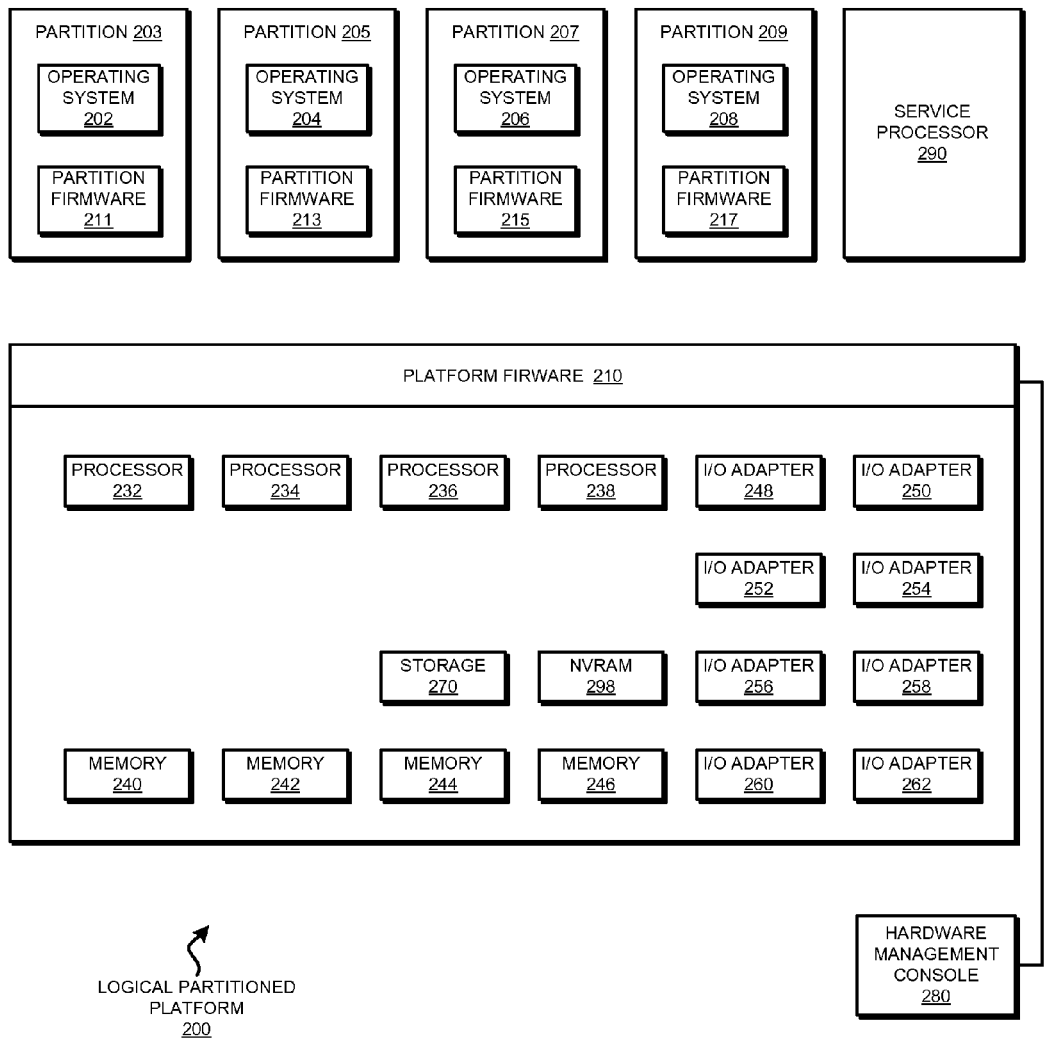
FIG. 2 depicts a block diagram of an example logical partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i®operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of adapters, such as PCI input/output adapters 120-121, connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Another type of adapter, such as memory mapped graphics adapter 148, is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using IBM-i, which are designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM or NVRAM).

Additionally, these partitions also include partition firmware 211, 213, 215, and 217. Partition firmware 211, 213, 215, and 217 may be implemented using initial bootstrap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by platform firmware 210. Thereafter, control is transferred to the bootstrap code with the bootstrap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of adapters, such as input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
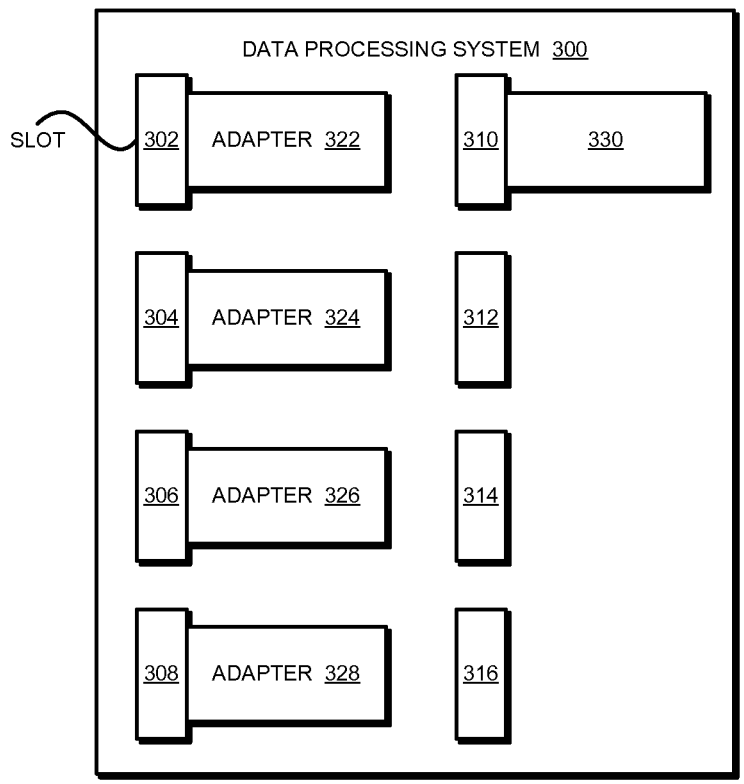
FIG. 3 depicts a block diagram of a data processing system configuration for using adapters with respect to which an illustrative embodiment can be implemented.

With reference to FIG. 3, this figure depicts a block diagram of a data processing system configuration for using adapters with respect to which an illustrative embodiment can be implemented. Data processing system 300 may be a stand-alone data processing system or a LPAR, such as logical partition platform 200 in FIG. 2.

Data processing system 300 may include one or more slots, such as slots 302, 304, 306, 308, 310, 312, 314, and 316. One or more slots may be occupied by adapters. For example, adapter 322 may occupy slot 302, adapter 324 may occupy slot 304, adapter 326 may occupy slot 306, adapter 328 may occupy slot 308, and adapter 330 may occupy slot 310. Slots 312, 314, and 316 may be unoccupied.

Adapters 322-330 may each be an adapter of any kind without limitation on the invention. For example, adapter 322 may be similar to PCI I/O adapter 129 in FIG. 1, adapter 324 may be similar to graphics adapter 148 in FIG. 1, adapter 326 may be similar to hard disk adapter 149 in FIG. 1, and adapter 328 may be a wireless networking adapter couple to a universal serial bus (USB) in data processing system 300. Slots corresponding to a particular adapter may be configured to receive that type of adapter or several types of adapters without limitation.

Figure 4:
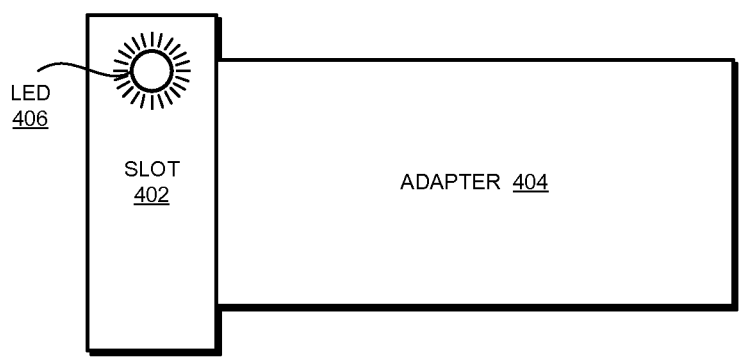
FIG. 4 depicts a block diagram of an example configuration of a slot in accordance with an illustrative embodiment.

With reference to FIG. 4, this figure depicts a block diagram of an example configuration of a slot in accordance with an illustrative embodiment. Slot 402 may be similar to slot 302 in FIG. 3. Adapter 404 may be similar to adapter 322 in FIG. 3.

According to an embodiment, slot 402 may be equipped with a visual notification device, such as light emitting diode (LED) 406. In one embodiment, visual notification device 406 may be an existing device in slot 402 that can be repurposed or used according to the embodiment. In another embodiment, visual notification device 406 may be installed to operate in conjunction with slot 402.

For example, many slots in presently used data processing systems include one or more LEDs to indicate various activities occurring in the seated adapters. For example, a slot equipped to receive a network interface card (NIC) may include "transmit," "receive," and "speed" LEDs that indicate whether the corresponding adapter is transmitting data or receiving data, and at what data rate.

In one embodiment, visual notification device 406 may be a "normally OFF" device. A normally OFF device is a device that remains in OFF state to indicate normal operation. In accordance with an illustrative embodiment, normally OFF visual notification device 406 is turned ON at a suitable point in the beginning of the configuration process of adapter 404.

In another embodiment, visual notification device 406 may be "normally ON" device. A normally ON device is a device that remains in ON state to indicate normal operation. In accordance with an illustrative embodiment, normally ON visual notification device 406 is turned OFF at a suitable point in the beginning of the configuration process of adapter 404.

The configuration process of adapter 404 then proceeds as planned. If the configuration process of adapter 404 completes as expected, such as by initializing adapter 404 without encountering an error condition, visual notification device 406 is manipulated. For example, if visual notification device 406 were a normally ON device that was turned OFF at the beginning of the configuration process, visual notification device 406 is turned ON at the completion of the configuration process. Conversely, if visual notification device 406 were a normally OFF device that was turned ON at the beginning of the configuration process, visual notification device 406 is turned OFF at the completion of the configuration process.

Should the configuration process of adapter 404 fail, such as by encountering an error condition, the state of visual notification device 406 remains the same as the state that was set at the beginning of the configuration process. For example, an LED that was turned ON at the beginning of the configuration process remains ON and is not turned OFF as when the configuration process completes successfully.

In an embodiment, the state of visual notification device may change to a state different from the state at the beginning and the state at successful completion. For example, an ON-OFF type LED may pulse at a given frequency or change to a different color if the configuration process does not complete as expected. For example, an implementation may conclude that the configuration process has encountered a defect in the adapter if the configuration process executes for longer than a predetermined time and may change the state of visual notification device 406.

One or more of existing or newly added visual notification device 406 may be used with an embodiment to indicate a defective adapter in that slot. For example, in one embodiment, the transmit LED, the receive LED and the speed LED of a particular slot all being turned ON may indicate a defective adapter. In another embodiment, any of the existing LEDs turned a specific color may indicate a defective adapter. In another embodiment, any of the existing LEDs pulsing at a specified rate may indicate a defective adapter.

These and other similar outputs or states of existing visual notification devices are contemplated within the scope of the invention. The same indications may be outputted using a visual notification device that is newly added to an existing slot within the scope of the invention.

Figure 5:
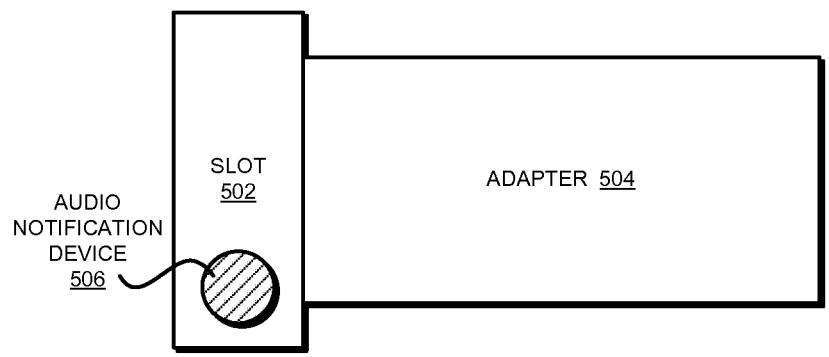
FIG. 5 depicts another example configuration of a slot in accordance with an illustrative embodiment.

With reference to FIG. 5, this figure depicts another example configuration of a slot in accordance with an illustrative embodiment. Slot 502 may be similar to slot 402 in FIG. 4. Adapter 504 may be similar to adapter 404 in FIG. 4.

Audio notification device 506 may be used in place of or in conjunction with a visual notification device, such as visual notification device 406 in FIG. 4. Audio notification device 506 may operate in a manner analogous to the operation of visual notification device 406 in FIG. 4.

For example, a normally OFF type audio notification device 506 may be turned ON at the beginning of a configuration process and turned OFF at successful completion of the configuration process. As another example, audio notification device 506 may be placed in a state where an intermittent sound is emitted from audio notification device 506 if the configuration process fails. A pitch or tone of the sound associated with audio notification device 506 may be similarly changed to indicate a configuration process failure.

Figure 6:
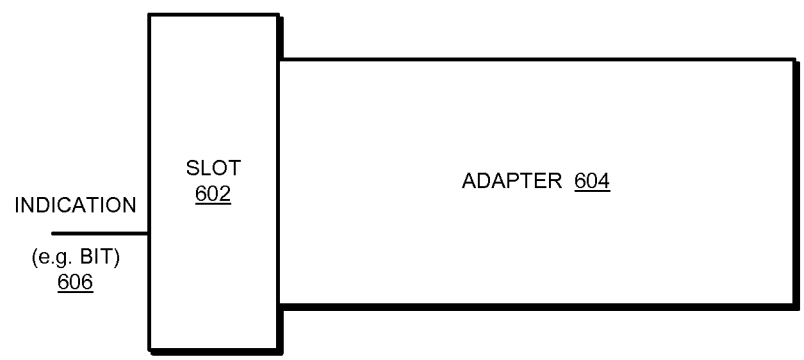
FIG. 6 depicts another example configuration of a slot in accordance with an illustrative embodiment.

With reference to FIG. 6, this figure depicts another example configuration of a slot in accordance with an illustrative embodiment. Slot 602 may be similar to slot 502 in FIG. 5. Adapter 604 may be similar to adapter 504 in FIG. 5.

Indication 606 may be used in place of or in conjunction with another notification device, such as visual notification device 406 in FIG. 4 or audio notification device 506 in FIG. 5. Indication 606 may operate in a manner analogous to the operation of visual notification device 406 in FIG. 4 or audio notification device 506 in FIG. 5.

Indication 606 may be another type of notification device or signal. For example, indication 606 may be an electrical signal corresponding to a single data bit. A normally OFF type indication bit 606 may be turned ON at the beginning of a configuration process and turned OFF at successful completion of the configuration process. As another example, indication 606 may be placed in a state where an indication bit 606 oscillates between 0 and 1 value at a set frequency if the configuration process fails. More than one bit may be used for indication 606.

The configurations depicted in FIGS. 4, 5, and 6 are depicted only as examples and are not limiting on the invention. Furthermore, an embodiment may be implemented with more than one type of notification devices. Any other type of one or more notification devices, apparatus, setups, tools, or data may be similarly used within the scope of the invention.

In one embodiment, notification device according to an embodiment may be preferably associated with a slot and not an adapter. Such an association may be desirable because a defective adapter may also induce or include a defect in the operation of the notification device making the notification emitted by the notification device unreliable.

In a system where multiple adapters may undergo configurations in parallel, an embodiment may further force serial configuration of the adapters. Serialization of the configuration may remove any confusion caused by possible dependency-related errors.

For example, presently an adapter configuration may fail because another adapter configuration failed, and not because of a defect in the adapter. If both adapters continue to be configured in parallel, notification devices associated with both slots will indicate failure whereas only one adapter may be defective. Serializing the configuration of the two adapters forces the configurations to proceed serially, to wit, one after the other.

Thus if the defective adapter is configured first and the configuration process fails, only the slot associated with the defective adapter will indicate the defective condition. The second slot, which seats an otherwise non-defective adapter, will not indicate a defective condition because the configuration of that adapter has not yet begun owing to the serialization of configuration, which stopped when the previous adapter failed to configure as expected.

With reference to FIG. 7, this figure depicts a flowchart of a process of identifying a defective adapter in accordance with an illustrative embodiment. Process 700 may be implemented in an application that manages slots in a data processing system, such as the operating system or a component thereof. Alternatively, process 700 may be implemented in an application that configures a slot, such as a proprietary bus or slot configuration application.

Process 700 may begin when the configuration of a data processing system begins (step 702). For example, in one embodiment, process 700 may be a part of the boot-up process of a data processing system and step 702 may pertain to the booting up of the data processing system. In another embodiment, step 702 may be omitted, such as when process 700 is used in conjunction with a hot-swap process.

Process 700 begins configuring an adapter in a slot of the data processing system (step 704). Process 700 activates an indication associated with the slot to indicate that the configuration process is in progress (step 706).

Process 700 determines whether the adapter configuration completed successfully (step 708). For example, in one embodiment, process 700 may receive an event that indicates that the configuration process has failed. In another embodiment, process 700 may detect a condition in the configuration that indicates that the adapter may be defective.

In another embodiment, a condition, such as the configuration process executing for longer than a predetermined time, may force process 700 to determine that the configuration process has failed. Detecting the failure of a configuration process is implementation specific. Accordingly, an implementation may implement step 708 in any manner suitable to that implementation within the scope of the invention.

If process 700 determines that the configuration process has completed successfully ("Yes" path of step 708), process 700 deactivates the indication (step 710). Process 700 ends thereafter.

If process 700 determines that the configuration process has failed ("No" path of step 708), process 700 allows the indication to remain active (step 712). Process 700 ends thereafter. In one embodiment, process 700 may trigger another process following step 712. For example, process 700 may trigger a notification process to notify an administrator, a logging process to log the error, a recovery process to attempt to recover the system from the failure, or any other process to take subsequent steps.

In one embodiment, process 700 may not be able to perform steps 708 and 712. In other words, a defective adapter may cause the data processing system, process 700, or both, to enter a non-responsive state. In such an embodiment, the activation of the indicator in step 706 still leaves the indicator activated as in step 712, without having to perform steps 708 and 712. Accordingly, the embodiment may still be able to indicate that the adapter is defective even when process 700 fails to execute all the steps.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for identifying a defective adapter. Using an embodiment of the invention, a system or application can easily determine which of the adapters being configured is defective. The system or application can identify the defective adapter by direct observation of the slot where the adapter is installed, seated, or with which the adapter is otherwise coupled. The system or application can also identify the defective adapter by using a remote application to detect an indication of the failure of the adapter's configuration.

The invention can take the form of an entirely hardware embodiment, entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for identifying a defective adapter, comprising:
   initiating configuration of the adapter, the adapter being coupled with a slot in a data processing system;
   activating, using a notification device at the slot, an indication of the configuration, wherein the notification device is an existing device associate with the slot for a first indication distinct from the indication of the configuration and is repurposed for use as the indication of the configuration;
   determining whether the configuration has completed successfully; and
   allowing the indication to remain activated responsive to the configuration not completing successfully, the activated indication identifying the defective adapter.

2. The computer implemented method of claim 1, wherein the adapter is one of a plurality of adapters, and wherein the configuration is one of a plurality of configurations to be performed on the plurality of adapters, further comprising:
   serializing the plurality of configurations such that a second configuration of a second adapter initiates when a first configuration of a first adapter has completed successfully; and
   preventing the second configuration from proceeding responsive to the activated indication identifying the defective adapter.

3. The computer implemented method of claim 1, wherein the configuration not completing successfully is a failure, further comprising:
   triggering a recovery process to recover the data processing system from the failure.

4. The computer implemented method of claim 1, wherein the adapter is identified as being defective one of (i) when the configuration has not concluded after passage of a predetermined period, and (ii) an event indicating the failure of the configuration is detected.

5. The computer implemented method of claim 1, further comprising:
deactivating the indication responsive to the configuration concluding successfully.

6. The computer implemented method of claim 1, wherein the indication being a state of the notification device, the notification device being one of (i) a visual notification device, and (ii) an audio notification device.

7. The computer implemented method of claim 1 wherein the initiating the configuration of the adapter occurs as a result of adding the adapter to the data processing system in a hot-swap process.

8. A computer usable program product comprising a computer usable storage device including computer usable code for identifying a defective adapter, the computer usable code comprising:
computer usable code for initiating configuration of the adapter, the adapter being coupled with a slot in a data processing system;
computer usable code for activating, using a notification device at the slot, an indication of the configuration, wherein the notification device is an existing device associate with the slot for a first indication distinct from the indication of the configuration and is repurposed for use as the indication of the configuration;
computer usable code for determining whether the configuration has completed successfully; and
computer usable code for allowing the indication to remain activated responsive to the configuration not completing successfully, the activated indication identifying the defective adapter.

9. The computer usable program product of claim 8, wherein the adapter is one of a plurality of adapters, and wherein the configuration is one of a plurality of configurations to be performed on the plurality of adapters, further comprising:
computer usable code for serializing the plurality of configurations such that a second configuration of a second adapter initiates when a first configuration of a first adapter has completed successfully; and
computer usable code for preventing the second configuration from proceeding responsive to the activated indication identifying the defective adapter.

10. The computer usable program product of claim 8, wherein the configuration not completing successfully is a failure, further comprising:
computer usable code for triggering a recovery process to recover the data processing system from the failure.

11. The computer usable program product of claim 8, wherein the adapter is identified as being defective one of (i) when the configuration has not concluded after passage of a predetermined period, and (ii) an event indicating the failure of the configuration is detected.

12. The computer usable program product of claim 8, further comprising:
computer usable code for deactivating the indication responsive to the configuration concluding successfully.

13. The computer usable program product of claim 8, wherein the indication being a state of the notification device, the notification device being one of (i) a visual notification device, and (ii) an audio notification device.

14. The computer usable program product of claim 8 wherein the initiating the configuration of the adapter occurs as a result of adding the adapter to the data processing system in a hot-swap process.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for identifying a defective adapter, the data processing system comprising:
a storage device including a storage medium, wherein the storage device stores computer usable program code; and
a processor, wherein the processor executes the computer usable program code, and wherein the computer usable program code comprises:
computer usable code for initiating configuration of the adapter, the adapter being coupled with a slot in a data processing system;
computer usable code for activating, using a notification device at the slot, an indication of the configuration, wherein the notification device is an existing device associate with the slot for a first indication distinct from the indication of the configuration and is repurposed for use as the indication of the configuration;
computer usable code for determining whether the configuration has completed successfully; and
computer usable code for allowing the indication to remain activated responsive to the configuration not completing successfully, the activated indication identifying the defective adapter.

18. The data processing system of claim 17, wherein the adapter is one of a plurality of adapters, and wherein the configuration is one of a plurality of configurations to be performed on the plurality of adapters, further comprising:
computer usable code for serializing the plurality of configurations such that a second configuration of a second adapter initiates when a first configuration of a first adapter has completed successfully; and
computer usable code for preventing the second configuration from proceeding responsive to the activated indication identifying the defective adapter.

* * * * *